Patented Oct. 10, 1933

1,930,146

UNITED STATES PATENT OFFICE 1,930,146

PROCESS FOR THE DEHYDRATION OF FORMIC ACID

Donald F. Othmer, Rochester, N. Y., assignor to Eastman Kodak Company, Rochester, N. Y., a corporation of New York No Drawing. Application January 19, 1931
Serial No. 509,873

6 Claims. (Cl. 260—122)

This invention relates to a process for the dehydration of formic acid and more particularly to such a process which employs n-propyl formate as an extracting liquid.

Aqueous formic acid has been dehydrated in the past by numerous processes wherein the formic acid is extracted by appropriate liquids. A process is also described in the application of Hans T. Clarke and Donald F. Othmer, Serial No. 304,706, filed September 8, 1928, which issued as Patent 1,826,302 on October 6, 1931 in which n-propyl formate is employed as a withdrawing agent wherein the aqueous formic acid is mixed with n-propyl formate and the mixture distilled in a rectifying column which carries over an azeotropic or constant boiling mixture of n-propyl formate and water leaving behind in the column the dehydrated formic acid. Although the foregoing Clarke and Othmer process has a very acceptable range of application, I have found that it can be improved upon where one is dehydrating very weak solutions of formic acid in water.

I have discovered that n-propyl formate may also be employed as a satisfactory extracting agent for formic acid prior to any subsequent dehydration of the acid such as for example by azeotropic distillation as set forth in the Clark and Othmer application.

It is, therefore, among the objects of my invention to provide a process wherein n-propyl formate is employed as an extracting agent for formic acid and also to combine such extracting process with an azeotropic distillation process whereby the extracted formic acid together with the n-propyl formate extractant are utilized without further separation.

My process of extracting has particular (though not sole) application to aqueous solutions of formic acid in which there is present less than 20% of formic acid. My process consists merely in thoroughly mixing with the aqueous formic acid to be extracted, a quantity of n-propyl formate and then allowing the mixture to settle and stratify into a water layer and a formic acid-containing n-propyl formate layer which can be separated by ordinary decantation or running off.

Since the distribution ratio of formic acid between contacting layers of water and n-propyl formate is approximately 1 to 1 it will be found, for instance, that mixing 100 pounds of n-propyl formate with 100 pounds of 20% aqueous formic acid will reduce the formic acid content of the water by ½ or to 10%. Increased quantities of n-propyl formate will correspondingly decrease the formic acid content of the water. However, as substantially complete extraction by single mixing would require an amount of n-propyl formate which would be economically prohibitive it will be obvious that to employ my process commercially there would be employed in conjunction therewith suitable counter current extraction methods and apparatus as well known to those skilled in the art and a novel example of which is disclosed in my co-pending application, Serial No. 456,272 filed May 27, 1930. Numerous other known expedients of operation may be employed without departing from the spirit and scope of my invention. My said application 456,272, for instance, describes an apparatus and method of mixing and separating extraction components by baffled circulating and recirculating sections of a vertically disposed device. It is mentioned at this point merely to illustrate the fact that the herein disclosed invention is of broad application insofar as the various mechanical expedients for using it are concerned.

Inasmuch as my process also contemplates employing the n-propyl formate layer containing absorbed formic acid and some water, in the Clarke and Othmer azeotropic distillation process, there is nothing uneconomical in employing a considerable quantity of n-propyl formate so long as the quantity substantially fully extracts the formic acid from the aqueous solution in which it is contained.

By my process I have found that it is possible to absorb or extract formic acid from its aqueous solution to a strength of 20 to 30% or even more. While n-propyl formate has only a small solubility for water, nevertheless some water is taken into the n-propyl formate with the formic acid so that it is not possible or at least not practical or feasible to be concerned about any reasonable quantities of water which are occluded in the n-propyl formate layer inasmuch as my process also contemplates feeding this mixture of n-propyl formate, formic acid and water into a distillation column wherein the three component mixture resulting from the above described process is united with the same three components (which exist of course in different proportions) on the plates of the distillation column employed in the process disclosed in the above Clarke and Othmer application for utilizing n-propyl formate as a withdrawing agent. As the n-propyl formate mingles with the dilute formic acid in the Clarke and Othmer column, it functions as a withdrawing agent, the formic acid which is introduced with the n-propyl formate proceeding to the base of the column along with other formic acid and the water which is added passing over as one of the components of the constant boiling mixture which leaves the column for condensation and separation, thereby dehydrating the formic acid introduced into the column.

Thus, it will be observed that when following the extraction step of my complete process, no separation of the n-propyl formate from the formic acid is necessary inasmuch as the three component extraction mixture merges into the distillation process without the necessity of any separation.

While certain proportions have been above mentioned, it will be understood that except for the fact that n-propyl formate is specified as the extracting agent, the principles underlying the operation of the invention are to be limited only by the scope of the claims hereunto appended.

What I claim as my invention and desire to be secured by Letters Patent of the United States is:

1. The process of extracting formic acid from aqueous solutions thereof containing up to about 30% of formic acid which comprises treating the aqueous formic acid with n-propyl formate, and separating from the mixture thus formed a solution of formic acid in n-propyl formate.

2. The process of extracting formic acid from aqueous solutions thereof containing up to about 30% of formic acid which comprises thoroughly agitating the aqueous formic acid with n-propyl formate and separating from the mixture thus formed a solution of formic acid in n-propyl formate.

3. The process of extracting formic acid from aqueous solutions thereof containing up to about 30% formic acid which comprises thoroughly agitating the aqueous formic acid with n-propyl formate, permitting the mixture thus formed to separate into a layer comprising a solution of formic acid in n-propyl formate and an aqueous layer, and separating the n-propyl formate-formic acid layer from the aqueous layer.

4. The process of extracting formic acid from aqueous solutions thereof containing up to about 30% formic acid which comprises thoroughly agitating the aqueous formic acid with n-propyl formate, permitting the mixture thus formed to separate into a layer comprising a solution of formic acid in n-propyl formate and an aqueous layer, separating the n-propyl formate-formic acid layer from the aqueous layer, and thereafter separating the formic acid from the n-propyl formate.

5. The process of extracting formic acid from aqueous solutions thereof containing up to about 30% of formic acid which comprises treating the aqueous formic acid with n-propyl formate, and separating from the mixture thus formed a solution of formic acid in n-propyl formate, and separating by distillation the formic acid from the n-propyl formate.

6. The process of extracting formic acid from an aqueous solution thereof containing not over 30% of formic acid which comprises treating the aqueous formic acid with n-propyl formate, separating from the extraction mixture a solution of formic acid in n-propyl formate also containing a small amount of water, and distilling off a constant boiling mixture of water and n-propyl formate from the solution.

DONALD F. OTHMER.